(12) United States Patent
Aktas et al.

(10) Patent No.: US 8,009,791 B2
(45) Date of Patent: Aug. 30, 2011

(54) FUEL SUPPORTS FOR NUCLEAR REACTORS

(75) Inventors: Birol Aktas, Wilmington, NC (US);
Robert James, Wilmington, NC (US);
Carlton W. Clark, Wilmington, NC (US); William Earl Russell, II, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 0 days.

(21) Appl. No.: 12/542,301

(22) Filed: Aug. 17, 2009

(65) Prior Publication Data
US 2009/0296875 A1    Dec. 3, 2009

Related U.S. Application Data

(62) Division of application No. 11/644,498, filed on Dec. 22, 2006, now Pat. No. 7,577,230.

(51) Int. Cl.
*G21C 3/06* (2006.01)

(52) U.S. Cl. ......... 376/453; 376/454; 376/438; 376/439

(58) Field of Classification Search .................. 376/453, 376/454, 438, 443–446, 362
See application file for complete search history.

(56) References Cited

U.S. PATENT DOCUMENTS

| | | | |
|---|---|---|---|
| 5,202,084 A * | 4/1993 | Fennern et al. | 376/433 |
| 5,241,570 A | 8/1993 | Challberg | |
| 5,386,440 A | 1/1995 | Kashiwai et al. | |
| 5,473,645 A | 12/1995 | Kowdley | |
| 5,513,233 A | 4/1996 | Hidaka et al. | |
| 5,570,399 A | 10/1996 | Sakamaki | |
| 6,813,327 B1 | 11/2004 | Challberg | |
| 6,929,810 B2 | 8/2005 | Purohit et al. | |
| 2003/0185334 A1 | 10/2003 | Fujii et al. | |

* cited by examiner

*Primary Examiner* — Rick Palabrica
(74) *Attorney, Agent, or Firm* — Harness, Dickey & Pierce, P.L.C.

(57) ABSTRACT

A fuel support for a nuclear reactor may include: a plurality of fuel support apertures, each fuel support aperture dimensioned for receiving a lower tie plate of a fuel assembly; and a plurality of lumens, each lumen being coupled to a different fuel support aperture. At least one lumen may be configured for attenuating a fluid flow differently than the fluid flow in at least one other of the lumen.

25 Claims, 6 Drawing Sheets

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 1  |   |   |   |   |   |   |   |   |   |    |    |    |    |    | 2  | 3  |
| 2  |   |   |   |   |   |   |   |   |   | 4  | 2  | 2  | 5  | 2  | 2  | 1  |
| 3  |   |   |   |   |   |   |   |   | 4 | 6  | 5  | 3  | 6  | 4  | 2  | 4  |
| 4  |   |   |   |   |   |   | 4 | 4 | 4 | 6  | 4  | 6  | 1  | 5  | 3  | 4  | 4 |
| 5  |   |   |   |   |   | 3 | 4 | 4 | 5 | 4  | 7  | 1  | 4  | 4  | 7  | 3  | 2 |
| 6  |   |   |   |   | 5 | 4 | 6 | 1 | 2 | 6  | 2  | 2  | 6  | 4  | 4  | 7  | 4 |
| 7  |   |   |   |   | 4 | 2 | 4 | 2 | 7 | 6  | 1  | 6  | 2  | 1  | 2  | 2  | 4 |
| 8  |   |   |   |   | 6 | 2 | 6 | 5 | 5 | 2  | 2  | 6  | 6  | 6  | 5  | 4  | 6 |
| 9  |   |   |   | 6 | 4 | 4 | 6 | 6 | 7 | 6  | 4  | 6  | 4  | 2  | 2  | 2  | 1 |
| 10 |   |   | 2 | 2 | 2 | 2 | 2 | 6 | 2 | 6  | 2  | 2  | 4  | 1  | 2  | 7  | 3 |
| 11 |   |   | 5 | 4 | 4 | 1 | 3 | 5 | 4 | 6  | 4  | 4  | 4  | 4  | 2  | 1  | 1 |
| 12 |   |   | 6 | 2 | 4 | 6 | 6 | 4 | 7 | 4  | 4  | 2  | 2  | 2  | 2  | 2  | 5 |
| 13 |   |   | 2 | 6 | 5 | 7 | 2 | 1 | 1 | 4  | 1  | 4  | 3  | 4  | 4  | 4  | 4 |
| 14 |   |   | 7 | 4 | 7 | 1 | 4 | 4 | 5 | 1  | 2  | 2  | 2  | 7  | 5  | 7  | 3 |
| 15 |   | 2 | 6 | 7 | 2 | 3 | 2 | 2 | 6 | 2  | 2  | 1  | 2  | 4  | 1  | 4  | 6 |
| 16 |   | 4 | 2 | 4 | 9 | 3 | 4 | 2 | 7 | 4  | 6  | 7  | 4  | 5  | 3  | 1  | 5 |

FUEL SUPPORTS FOR NUCLEAR REACTORS

PRIORITY STATEMENT

This application is a divisional application of U.S. patent application Ser. No. 11/644,498, filed on Dec. 22, 2006, now U.S. Pat. No. 7,577,230 and claims the associated benefit under 35 U.S.C. §121. The entire contents of parent U.S. patent application Ser. No. 11/644,498, entitled "FUEL SUPPORT AND METHOD FOR MODIFYING COOLANT FLOW IN A NUCLEAR REACTOR", are incorporated herein by reference.

BACKGROUND

1. Field

The present disclosure relates to nuclear reactors and, more specifically, fuel supports for supporting fuel assemblies and associated methods for modifying coolant flow to fuel assemblies.

2. Description of Related Art

The statements in this section merely provide background information related to the present disclosure and may not constitute prior art.

A nuclear reactor pressure vessel (RPV) has a generally cylindrical shape and is closed at both ends, e.g., by a bottom head and a removable top head. A top guide is spaced above a core plate within the RPV. A core shroud, or shroud, surrounds the core plate and is supported by a shroud support structure. Particularly, the core shroud has a generally cylindrical shape and surrounds both the core plate and the top guide. The top guide includes several openings, and fuel assemblies are inserted through the openings and are supported by the core plate. The core plate includes a flat plate supported by a plurality of beams.

A nuclear reactor core includes a plurality of individual fuel assemblies that have different characteristics that affect the strategy for operation of the core. For example, a nuclear reactor core typically has several hundred individual fuel assemblies that have different characteristics, each fuel bundle having a plurality of fuel rods. The fuel assemblies are arranged within the reactor core so that the interaction between the fuel assemblies satisfies regulatory and reactor design guidelines and constraints. In addition the core arrangement determines the cycle energy, which is the amount of energy that the reactor core generates before the core needs to be refreshed with new fuel elements, the core loading arrangement preferably optimizes the core cycle energy.

A core cycle is determined from one periodic reactor core refueling to a second reactor core refueling. During the course of the cycle of operation, the excess reactivity, which defines the energy capability of the core, is controlled in a variety of ways. Specifically, a burnable poison, e.g., gadolinia, is incorporated in the fresh fuel. The quantity of initial burnable poison is determined by design constraints typically set by the utility and by the National Regulatory Commission (NRC). The burnable poison controls most, but not all, of the excess reactivity. A second way is through the manipulation of control rods within the core. Control rods control the excess reactivity. Specifically, the reactor core contains control rods which assure safe shutdown and provide the primary mechanism for controlling the maximum power peaking factor. The total number of control rods available varies with core size and geometry, and is typically between fifty and two hundred and fifty. The position of the control rods, i.e., fully inserted, fully withdrawn, or somewhere between, is based on the need to control the excess reactivity and to meet other operational constraints, such as the maximum core power peaking factor.

Coolant is introduced in the core to cool the core, to be transitioned into steam as a working fluid for energy generation, and to provide neutron source aid in the nuclear reaction. Normal coolant flow enters the fuel assemblies as a single phased flow with slightly sub-cooled coolant. The flow approaches the fuel support vertically upward and then turns horizontally as the flow enters the inlet to a fuel support supporting a fuel assembly. The flow then passes through an orifice of the fuel support to provide a pressure drop to assist coolant distribution to the fuel assemblies. The flow then turns vertical and enters the lower tie plate of the fuel assembly and is distributed around the individual fuel rods of the fuel assembly.

Known reactors have included fuel support orifice regions within the core, one around the peripheral and one near the center. The peripheral region includes all fuel locations around the periphery of the core, and the center region includes the remainder of the locations. The fuel support orifices are designed to limit the flow to the fuel assemblies in the peripheral region to about half of the flow per fuel element of the center region. Limiting the peripheral flow by this magnitude has permitted the very low power peripheral fuel elements to saturate the coolant flow, but with maintaining the exit quality and average voids that are still much lower than for the other higher power region. This uneven exit quality and average void can produce inefficient steam separation and nuclear moderation.

It is also known that the coolant flow can be adjusted through varying the design of the fuel assembly. For example, it is known that each fuel assembly can include a main coolant flow channel and inlet that has a substantial constant flow. However, the fuel assemblies can also include one or more secondary coolant flow channels that can vary to adjust the coolant flow in the particular fuel assemblies. In some cases, three types of fuel assemblies can provide three different secondary coolant flows. Each such fuel assembly can be positioned in the core to provide for a desired coolant flow. For example, three different fuel assemblies have been arranged into three or more core regions. The flow of coolant through each fuel assemblies in each region can be different from the coolant flow through the fuel assemblies in each other region based on the position of the three different fuel assemblies and the layout of the regions within the core. However, this requires the manufacture of different types of fuel assemblies and/or tie plates and the administration of those different designed of fuel assemblies. Other methods have included attaching a flow restricting device to the lower tie plate of the fuel assemblies in which flow is intended to be restricted. Such lower tie plate flow restricting devices provide one method for flow modification, but often require additional administration and manufacturing procedures for attachment of the flow restricting devices to the lower tie plates.

SUMMARY

The inventors hereof have succeeded at designing an improved fuel support and method of use for modifying coolant flow into nuclear reactor fuel assemblies. A variety of designs of fuel assemblies can provide for modified coolant flow on a per fuel assembly basis within a single fuel support, or a variety of different combinations of modified coolant flow between different fuel supports. As such, the fuel supports and methods of use can provide for new and improved reactor core design opportunities by modifying fluid flow on a per fuel assembly basis throughout the reactor core.

According to one aspect, a fuel support for a nuclear reactor includes a plurality of fuel support apertures. Each fuel support aperture is dimensioned for receiving a lower tie plate of a fuel assembly and a plurality of lumens. Each lumen is fluidly coupled to a different fuel support aperture with at least one lumen being configured for attenuating a fluid flow differently than the fluid flow in at least one other lumen.

According to another aspect, a fuel support for a nuclear reactor includes means for mounting a plurality of fuel assemblies within a reactor core and means for selectively providing an attenuated fluid flow to at least one of the fuel assemblies mounted by the means for mounting.

According to yet another aspect, a fuel support for a nuclear reactor includes a body having an outer dimension configured for insertion into a mounting hole of a core plate. A cavity is dimensioned for receiving a control rod. Also included are a plurality of fuel support apertures and a plurality of lumens. Each fuel support aperture is dimensioned for receiving a lower tie plate of a fuel assembly and each lumen is fluidly coupled to a different fuel support aperture. Further included is a fixture about, at least a portion of, an interior surface defining each lumen, and at least one flow control member configured for attenuating a flow of a fluid through one of the lumen as compared to at least one other lumen. The at least one flow control member is dimensioned for positioning within one or more lumen and is at least partially secured therein by the fixture.

According to yet another aspect, a method of modifying the flow of fluid within a reactor core includes installing a fuel support in a reactor core. The fuel support has a plurality of fuel support apertures, each with an associated lumen. Each fuel support aperture is dimensioned for receiving a lower tie plate of a fuel assembly. Each lumen is configured for delivering fluid to the fuel assembly received by the associated aperture. At least one lumen is configured for attenuating a fluid flow through the lumen as compared to the fluid flow through at least one other lumen. The method also includes inserting a lower tie plate of a fuel assembly in each aperture of the fuel support.

According to still another aspect, a method for configuring a nuclear reactor includes identifying a fluid flow for each of a plurality of fuel assemblies within the reactor, and specifying a fuel support fluid flow for each of the identified fuel assembly fluid flows.

Further aspects of the present invention will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION OF EXAMPLE EMBODIMENTS

The following description is merely exemplary in nature and is not intended to limit the present disclosure or the disclosure's applications or uses.

In some embodiments, a fuel support for a nuclear reactor includes a plurality of fuel support apertures; each fuel support aperture is dimensioned for receiving a lower tie plate of a fuel assembly. The fuel support includes a plurality of lumens, each fluidly coupled to a different aperture. As described herein, a lumen is generally a duct or an inner space or cavity having an elongated channel. The lumen is also fluidly coupled to an inlet for receiving a fluid flow. One or more of the lumen can be dimensioned for attenuating a fluid flow from that received at the inlet differently than the fluid flow in another of the lumen of the fuel support, or among lumen of other fuel supports within the reactor. For example, a first lumen can provide a first flow attenuation that is less than about fifty (50) percent of a total fluid flow and a second lumen can provide a second flow attenuation that is greater than about fifty (50) percent.

In the alternative, the lumen can be configured for receiving and having a fluid attenuation device removably or permanently placed and held within the lumen. Whether formed by the fuel support lumen design or with a fluid attenuation device placed therein, each lumen of the fuel support can have the same or a different flow to its related fuel assembly and lower tie plate by customizing the attenuating aspects on a per lumen basis.

The lumen can be of any design or shape and in some preferred embodiments, each lumen is substantially free of multiple bends, angles and curves from the fuel support aperture to the lower aperture from which fluid is received from the lower plenum and/or a control rod guide tube. Additionally, one or more lumen of a fuel support can include a gradual reduction in the cross-sectional area of the lumen from the fuel support aperture to the lower aperture. Such gradual reduction can provide for reducing any turbulence or pressure increase within the lumen, other than that desired or specified for attenuating the fluid flow of the lumen. It is, however, possible that one or more lumen can include a single substantial reduction in the cross-sectional area of the lumen between the fuel support aperture and the lower aperture. A single substantial reduction can provide for the mating of aperture sizes without unnecessarily disturbing the fluid flow, adding in asymmetries in the flow, or adding unnecessary or undesirable pressure increases. This can be better understood with reference to the figures.

Figure 1:
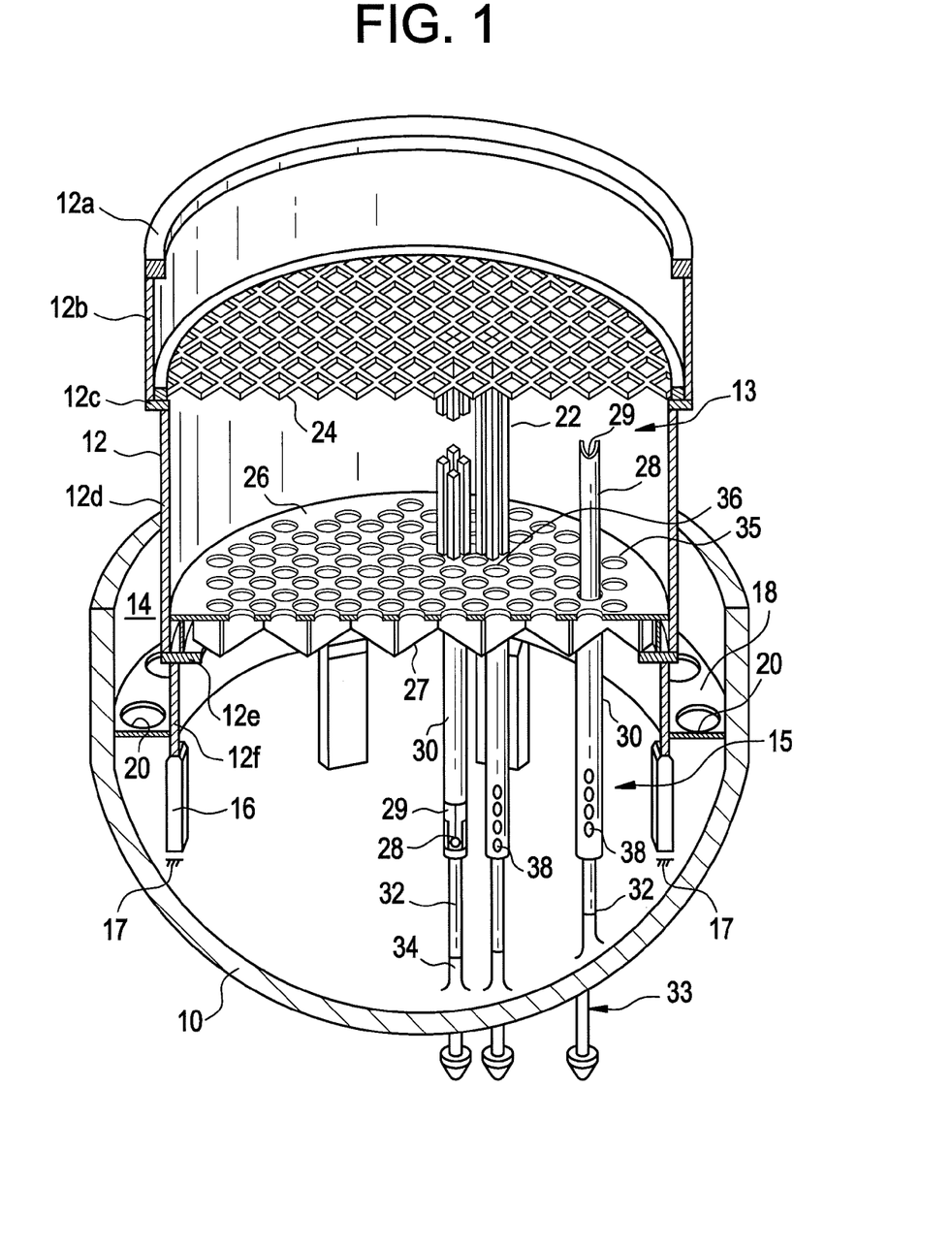
FIG. 1 is a cutaway side view of a nuclear reactor operating environment suitable for some exemplary embodiments.

As seen by way of the exemplary operating environment of FIG. 1, a conventional boiling water reactor (BWR) has a reactor pressure vessel 10 and a core shroud 12 arranged concentrically in the reactor pressure vessel 10 with an annular region, namely, a downcomer annulus 14, therebetween. The core shroud 12 is a stainless steel cylinder surrounding the nuclear fuel core 13. In particular, the core shroud 12 comprises a shroud head flange 12a for supporting the shroud head (not shown); a circular cylindrical upper shroud wall 12b having a top end welded to shroud head flange 12a; an annular top guide support ring 12c welded to the bottom end of upper shroud wall 12b; a circular cylindrical middle shroud wall welded assembly 12d welded to the top guide support ring 12c; and an annular core plate support ring 12e welded to the bottom of the middle shroud wall 12d and to the top of a lower shroud wall 12f. As seen in FIG. 1, the core shroud 12 is vertically supported by a plurality of shroud support legs 16, each of the latter being welded to a bottom head 17 of the reactor pressure vessel 10. The core shroud 12 is laterally supported by an annular shroud support plate 18, which is welded at its inner diameter to the core shroud 12 and at its outer diameter to the reactor pressure vessel 10. The shroud support plate 18 has a plurality of circular jet pump apertures 20 in flow communication with diffusers of a plurality of jet pump assemblies (not shown), The fuel core 13 of a BWR consists of a multiplicity of upright and parallel fuel bundle assemblies 22 arranged in arrays, each fuel assembly 22 includes an array of fuel rods inside a fuel channel made of zirconium-based alloy. Each array of fuel bundle assemblies is supported at the top by a top guide 24 and at the bottom by a core plate 26 and its underlying support structure 27. The core plate 26 subdivides the reactor into the core 13 and a lower plenum 15. The core top guide 24 provides lateral support for the top of the fuel assemblies 22 and the core plate 26 provides lateral support for the bottom of the fuel assemblies 22. This lateral support maintains the correct fuel channel spacing in each array to permit vertical travel of a control rod 28 including the control rod blades 29 between the fuel assemblies 22.

The power level of the reactor is maintained or adjusted by positioning the control rods 28 up and down within the core 13 while the fuel bundle assemblies 22 are held stationary. Each control rod 28 has a cruciform cross-section consisting of four wings or control rod blades 29 at right angles. Each blade 29 consists of a multiplicity of parallel tubes welded in a row with each tube containing stacked capsules filled with neutron-absorbing material. Each control rod 28 is raised or lowered with the support of a control rod guide tube 30 by an associated control rod drive 33 which can be releasably coupled by a spud at its top to a socket in the bottom of the control rod 28.

The control rod drives 33 are used to position control rods 28 in a BWR to control the fission rate and fission density, and to provide adequate excess negative reactivity to shutdown the reactor from a normal operating or accident condition. Each control rod drive 33 is mounted vertically in a control rod drive housing 32 which is welded to a stub tube 34, which in turn is welded to the bottom head 17 of the reactor pressure vessel 10. The control rod drive 33 is a double-acting, mechanically latched hydraulic cylinder. The control rod drive 33 is capable of inserting or withdrawing a control rod 28 at a slow controlled rate for normal reactor operation and of providing rapid control rod 28 insertion (scram) in the event of an emergency requiring rapid shutdown of the reactor.

The control rod drive housing 32 has an upper flange that bolts to a lower flange of the control rod guide tube 30. Each control rod guide tube 30 sits on top of and is vertically supported by its associated control rod drive housing 32. The uppermost portion of the control rod guide tube 30 penetrates a corresponding circular aperture in the core plate 26. There can be more than 140 control rod guide tubes 30 penetrating an equal number of circular core plate apertures 35 in the core plate 26, each core plate aperture 35 has a diameter slightly greater than the outer diameter of the control rod guide tube 30.

The control rod drive housings 32 and control rod guide tubes 30 have two functions: (1) to house the control rod drive 33 mechanisms and the control rods 28, respectively, and (2) to support the weight of the fuel in the fuel assemblies 22. The fuel weight is reacted at an orifice of a fuel support 36 that is positioned on the top of the control rod guide tube 30. The control rod guide tubes 30 and rod drive housings 32 act as columns carrying the weight of the fuel.

During operation of the reactor, water in the lower plenum 15 enters ports 38 of the control rod guide tube 30. The water is channeled within the control rod guide tube 30 or directly to the lower plenum 15 into an inlet fluidly coupled to the lumen 36 for providing fluid from the lower plenum 15 to the fuel assembly 22 via inlet of the fuel support 36 or from a coupled control rod guide tube 30 and into the fuel support lumen 46. The fluid flow in one or more of the lumen 46 is attenuated differently from the other lumen 46 of the fuel support 36. Each lumen 46 provides the fluid flow (whether attenuated or not) to a fuel support aperture 44 in which a lower tie plate 57 of a fuel assembly 22 is positioned. The water enters the inlet, travels through a lumen 46 where the flow is modified by the design of the lumen 46 or by a flow control member 58 positioned within the lumen 46. After passing the lumen 46, the modified flow continues upward through the fuel support 36 aperture to the lower tie plate 57 of the fuel assembly 22. The water continues to rise in the fuel assemblies 22 and in the core 13, with a substantial amount turning to steam, which is used in the production of electrical energy.

Figure 2:
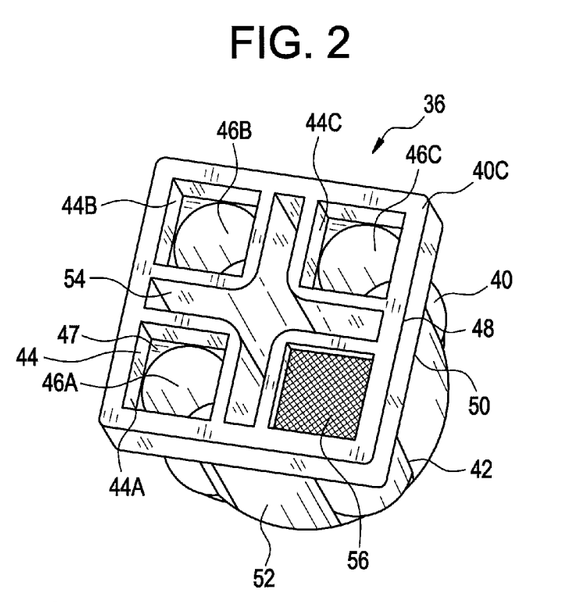
FIG. 2 is a top perspective view of a fuel support for supporting four fuel assemblies and having at least two lumen having different fluid flow attenuations according to one exemplary embodiment.

One embodiment of a fuel support 36 is illustrated in FIG. 2. A fuel support 36 includes a body 40 having a lower portion 42 with an outer dimension for insertion into a core plate aperture 35 of the core plate 26. The fuel support apertures 44 are coupled to the lumens 46 in an upper portion 48 of the body 40. In order to hold the fuel support 36 at the core plate 26, one or more flanges 50 or other dimensional features or outer designs on an outer surface of the fuel support 36 compressively engage the core plate 26 about the core plate aperture 35. The fuel support 36 includes a lower end 52 on the lower portion 42 for coupling to a control rod guide tube 30 or for terminating the lumen 46 and the fuel support 36. This can also include receiving the fluid flow from the control rod guide tube 30. While not illustrated, but is known in the art, the fuel support 36 can also include an inlet (not shown) along an outer surface of the lower portion 42 coupled to the lumen 46 for receiving fluid flow directly from the lower plenum 15 rather than, or in addition to, from a orifice at the lower end 52.

The fuel support 36 includes a cavity 54 that is dimensioned for receiving the control rod 28. The cavity 54 can be any shape but is generally a cruciform shape to correspond with the cruciform shape of a control rod 28 having four control rod blades 29.

Each fuel support aperture 44 is coupled to the lumen 46 and two or more lumens 46 of the fuel support 36 provide for a different fluid flow therethrough. As shown by way of example in FIG. 2, each of the four fuel support apertures 44 is essentially equivalent for interfacing to fuel assemblies 22. However, each coupled lumen 46 can be different. As shown, lumen 46A include a mating fixture 47 that can be formed separately as a lip or protrusion, or from the mating a square shape of the fuel support aperture 44 to a substantially round lumen 46A as illustrated in FIG. 2. The lumen 46A is illustrated as having a diameter equal to the width of the fuel support aperture 44. While lumen 46B is coupled to the same size and shaped fuel support aperture 44B, lumen 46B includes a beveled or chamfered reduction in the diameter. As such, the lumen 46B will provide a reduced fluid flow to fuel support aperture 44B as compared to that provided by lumen 46A to fuel support aperture 44A. Similarly, lumen 46C has a substantially reduced diameter and will provide a substantially reduced fluid flow to fuel support aperture 44C as compared to both lumen 46A and lumen 46B. FIG. 2 also includes, by way of example, a filter 56 that can be positioned within the fuel support aperture 44 and/or the lumen 46. Such a filter 56 can attenuate the fluid flow through the lumen 46, redistribute the fluid flow within the lumen 46, and/or filter debris from entering the fuel support aperture 44 of the fuel assembly 22, or reduce the debris falling from the fuel assembly 22 back into the lumen 46 during a shutdown of the reactor or when relocating the fuel assembly 22 to a new location during a refueling. The filter 56 can be permanently mounted in the fuel support aperture 44 or lumen 46 of the fuel support 36, or can be removable during refueling operations.

Figure 3A:
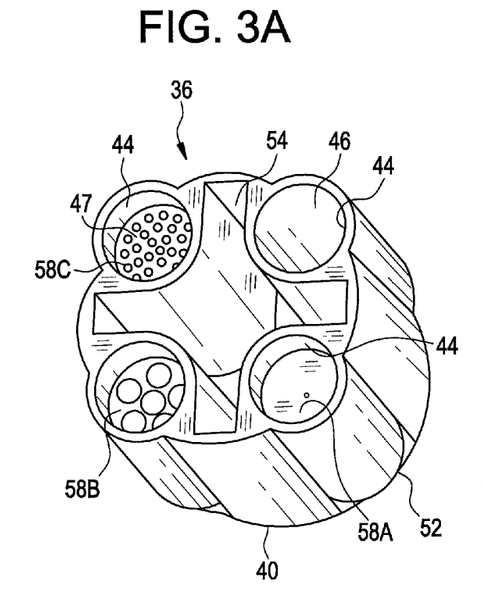
FIG. 3A is a top perspective view of a fuel support having a plurality of lumens with different fluid flow attenuations according to another exemplary embodiment.
Figure 3B:
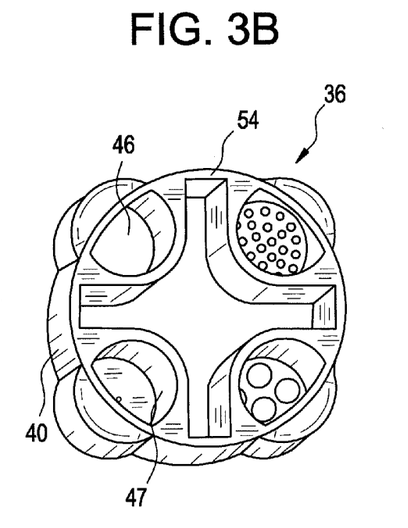
FIG. 3B is a bottom perspective view of the fuel support of FIG. 3A.

Additionally, other flow control members can be positioned in one or more lumen 46 for providing two or more attenuated fluid flows. Referring now to FIGS. 3A and 3B, one or more flow control members 58 (denoted as 58A, 58B, and 58C in FIG. 3A) can be placed or affixed within the lumen 46 of the fuel support 36. These flow control members 58 can also be formed or manufactured during the manufacture of the fuel support 36 and be a permanent feature of the fuel support 36 in some embodiments.

When flow control members 58 are removable, such as removable plate or spacer, a fixture in the lumen or the aperture can retain the flow control member 58 in place. Each of the lumen 46 as illustrated in FIGS. 3A and 3B has a different fluid flow characteristic. As shown, one lumen is completely open with an unrestricted or at least maximized flow for a lumen of the fuel support 36. A second lumen 46 includes a flow control member 58A having a single small orifice which provides for a significant amount of fluid flow attenuation. A third lumen 46 includes a flow control member 58B having a plurality of larger orifices, which will provide a moderate amount of fluid flow attenuation as well as a redistribution of the fluid flow in the lumen 46 as provided to the fuel support aperture 44 and therefore to a coupled fuel assembly 22. A fourth lumen 46 includes a flow control member 58C have a greater plurality of smaller orifices, as compared to flow control member 58B that provides a different amount of attenuation and a different redistribution of the fluid flow from the lumen 46 to the fuel support aperture 44. Each flow control member 58 can be designed to have any desired attenuation with two or more being different. For example, one flow control member 58 can have an orifice with any diameter that is less than (and in some embodiment significantly less than) the diameter of the lumen 46. In one embodiment of a fuel support 36, a plurality of orifices has diameters that are about one-tenth the diameter or width of the lumen 46, or single orifice can have a diameter of between ten (10) and ninety (90) percent of the width or diameter of the lumen 46.

The mating fixture 47 can be about all or a portion of the interior surface defining fuel support aperture 44 and/or each lumen 46. The mating fixture 47 can be configured to at least partially secure a flow control member 58 within the lumen 46. As noted above, the mating fixture 47 can be a lip that extends from a portion of the interior surface defining the lumen 46 or can be via a change in the shape of the fuel support aperture 44, the lumen 46, or the mating of the fuel support aperture 44 to the lumen 46. The mating fixture 47 can include a stepped reduction in the diameter of the lumen, a temporary reduction in the width or diameter of the lumen 46, one or more tabs extending from a portion of the interior surface defining the lumen, by way of examples.

Figure 4:
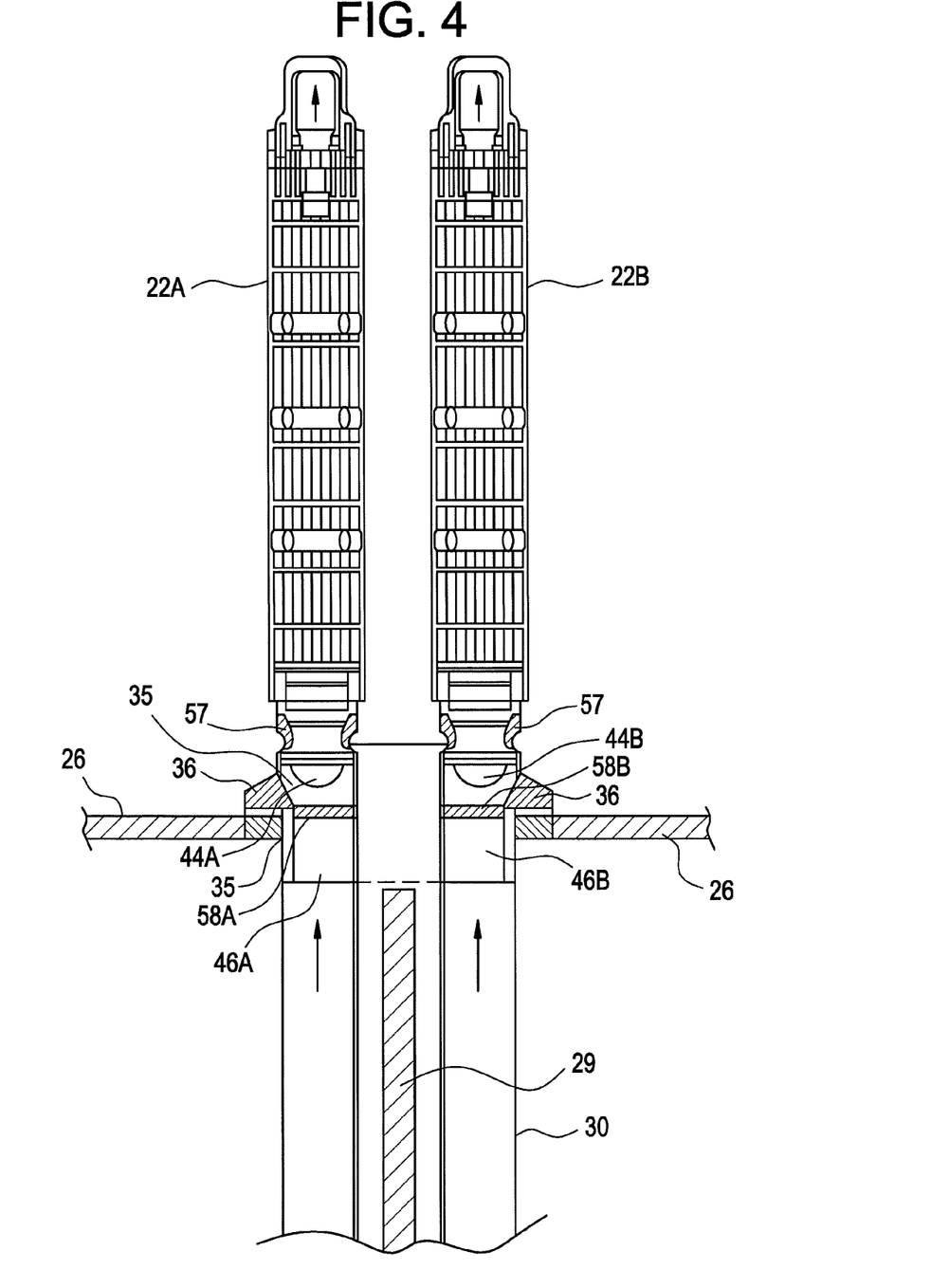
FIG. 4 is cutaway side view of a fuel support installed on a core plate and coupled to a control rod guide tube with two fuel assemblies being positioned in two of the fuel support apertures of the fuel support according to one exemplary embodiment.

In operation, one or more embodiments of the fuel support 36 as described herein provides for a different fluid flow to two or more fuel assemblies 22 supported by the fuel support 36. As shown in FIG. 4, the fuel support 36 supports two fuel assemblies 22A and 22B. The fuel assembly 22A is mounted to fuel support aperture 44A and is fluidly coupled to lumen 46A. A flow control member 58A is positioned in lumen 46A having a plurality of small orifices for providing a first attenuated fluid flow. The fuel assembly 22B is mounted to fuel support aperture 44B and is fluidly coupled to lumen 46B. A flow control member 58B is positioned in lumen 46B having fewer and large orifices for providing a second attenuated fluid flow to a second fuel assembly 22. In this example, the first attenuated flow is reduced or less than the second attenuated flow.

Figure 5:
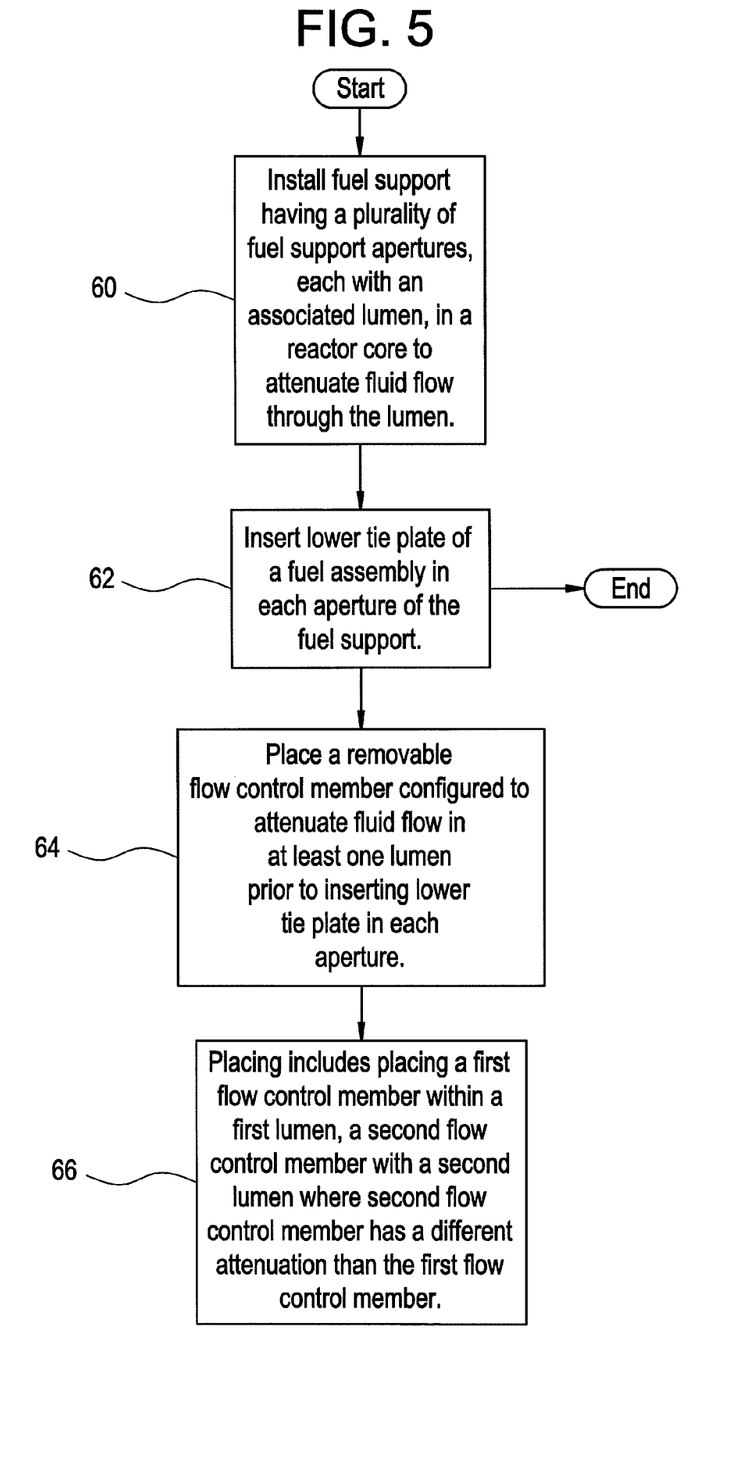
FIG. 5 is a flowchart of a method of modifying the flow of fluid within a reactor core using a fuel support having a plurality of different attenuations of fluid flow according to one exemplary embodiment.

Referring now to FIG. 5, in operation of one embodiment a method of modifying the flow of fluid within a reactor core includes installing a fuel support in a reactor core as in process 60. The fuel support has a plurality of fuel support apertures each with an associated lumen. Each fuel support aperture is dimensioned for receiving a lower tie plate of a fuel assembly. Each lumen configured for delivering fluid to the fuel assembly received by the associated aperture. At least one lumen is configured for attenuating a fluid flow through the lumen as compared to the fluid flow through another one of the lumen. In process 62, a lower tie plate of a fuel assembly is inserted in each aperture of the fuel support. Additionally, in some embodiments, a removable flow control member can be placed within a lumen as in process 64 for attenuating the fluid flow in the lumen prior to inserting the lower tie plate in each aperture. A different flow control member can be placed in a different lumen of the same fuel support for providing a different attenuation than the attenuation of the first flow control member as shown in process 66.

Figure 6:
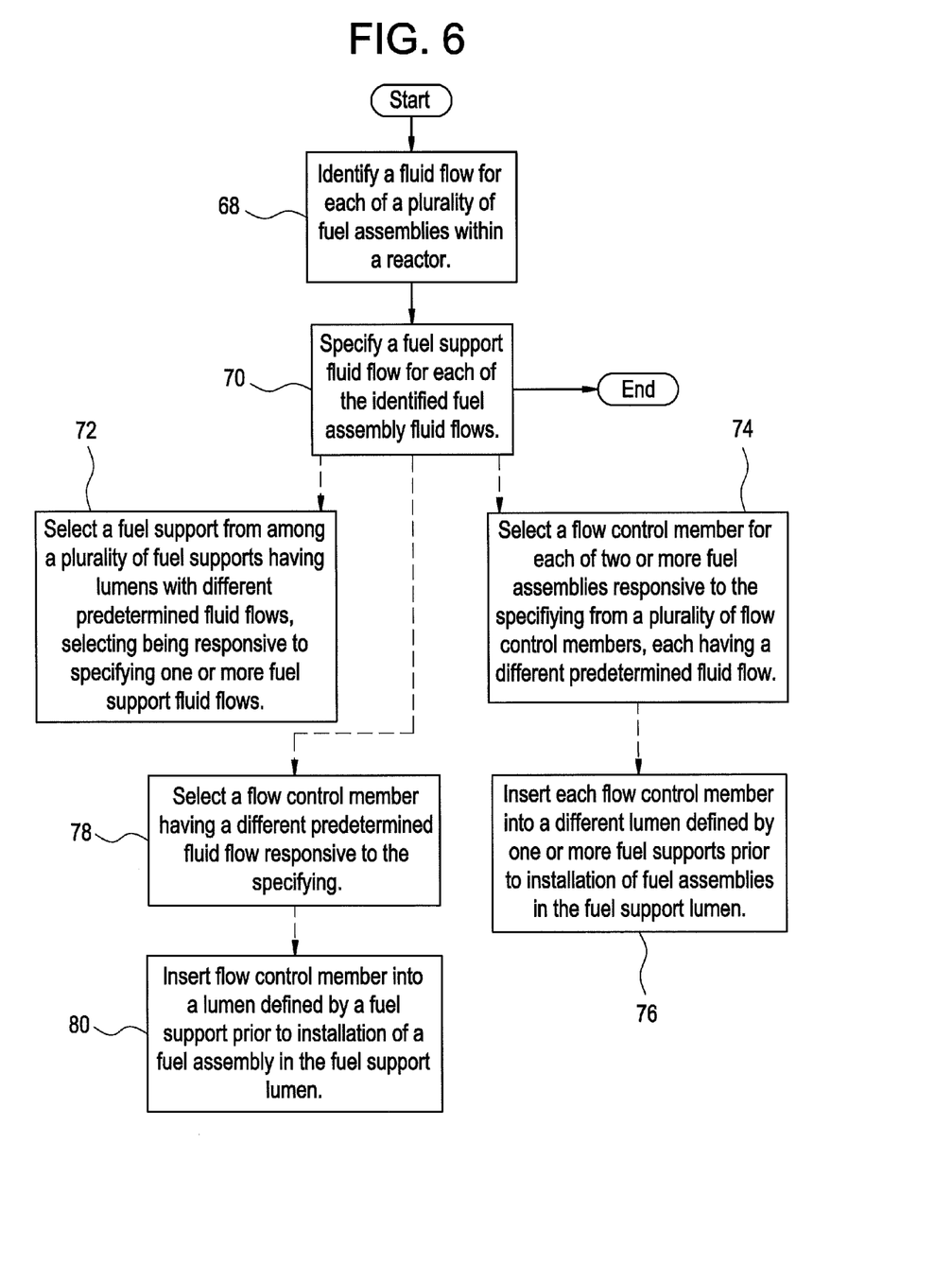
FIG. 6 is a flowchart of a method for configuring a nuclear reactor with a fuel support having a plurality of fluid flow attenuations according to one exemplary embodiment.

Referring now to FIG. 6, in another embodiment, a method for configuring a nuclear reactor includes identifying a fluid flow for each of a plurality of fuel assemblies within the reactor as in process 68. The method also includes specifying a fuel support fluid flow for each of the identified fuel assembly fluid flows as in process 70. This can further include selecting a fuel support from among a plurality of fuel supports having lumen with different predetermined fluid flows as in process 72. This selecting can be responsive to the specifying of one or more fuel support fluid flows of process 70.

The method can also include selecting a flow control member for each of two or more fuel assemblies 36 responsive to the specifying as in process 74. This can include selecting from a plurality of flow control members each having a different predetermined fluid flow. Each flow control member can be inserted into a different lumen defined by one or more fuel supports 36 prior to installation of fuel assemblies into the fuel support lumen as in process 76.

In other embodiments, the method can include selecting a flow control member from among a plurality of flow control members each having a different predetermined fluid flow responsive to the specifying as in process 78. The flow control member can then be inserted into a lumen defined by a fuel support prior to installation of a fuel assembly in the fuel support lumen as in process 80.

Figure 7:
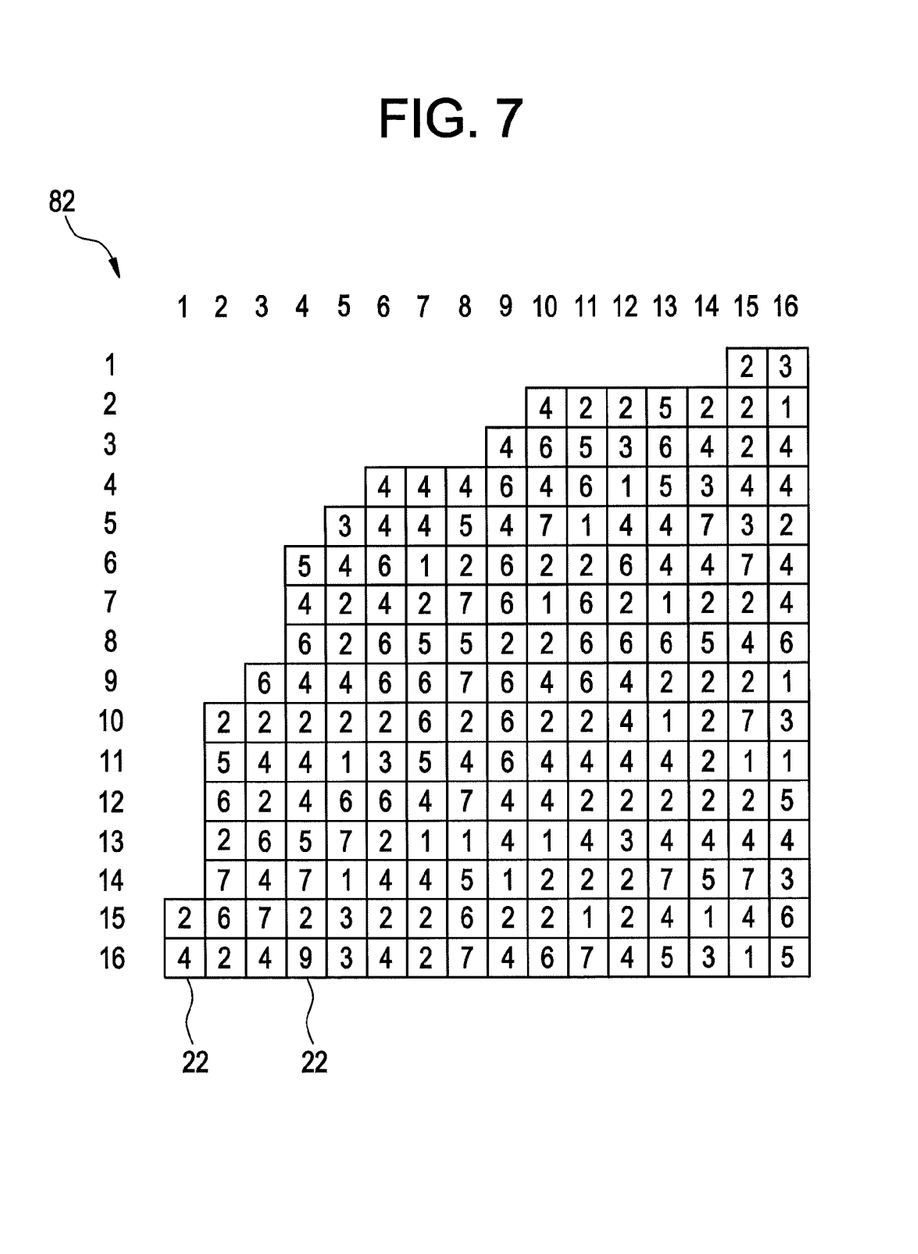
FIG. 7 is an exemplary schematic plan view of a quarter of a reactor core illustrating the per-fuel assembly fluid flows enabled by a fuel support having a plurality of fluid flow attenuations according to one exemplary embodiment.

The application of the fuel support 36 as described herein and the methods of use and operation can therefore provide for customized fluid flow designs in a reactor core on a per fuel assembly basis. One example of this is shown in FIG. 7. The layout of a quarter core 82 includes a plurality of fuel assemblies 22. Each fuel assembly 22 within the core can be designed to have a customized fluid flow received by the fuel support 36, by the specification of the fluid attenuation within each lumen 46 of each fuel support 36. As represented here, each fuel assembly 22 can be designated to have a different flow rate, shown by the numeric numbers from one (1) to nine (9) in this exemplary embodiment. Of course, each and every fuel assembly 22 can have a fluid flow received by the fuel support 36 and the lumen 46 therein having any predetermined quantity or value and is not limited to only one (1) to nine (9) flow rates. In some examples, these flow rates can be as low zero and as high as about 1.5 $Mlb_m/hr-ft^2$ s or as low as about 0.40 $Mlb_m/hr-ft^2$ (e.g., thousands of pounds of fluid mass per hour per square foot) and up to about 0.70 $Mlb_m/hr-ft^2$. As discussed above, each fuel support 36 can support a plurality of fuel assemblies 22, and a plurality of attenuated fluid flows, therefore a plurality of fluid flow rates from the fuel support 36, its lumen 46, and into the associated fuel assembly 22.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A fuel support for a nuclear reactor, comprising:
   a body insertable into a mounting hole of a core plate, the body defining a plurality of fuel support apertures, each fuel support aperture dimensioned for receiving a lower tie plate of a fuel assembly; and
   a plurality of lumens, each lumen being directly, fluidly coupled to a different fuel support aperture;
   wherein at least one lumen is configured for attenuating a fluid flow differently than the fluid flow in at least one other of the lumen.

2. The fuel support of claim 1, further comprising:
   at least one flange on an outer surface for engaging the core plate;
   a cavity dimensioned to receive a control rod;
   a lower end defining a portion of the control rod cavity; and
   lower apertures about the lower end, each fluidly coupled to a lumen.

3. The fuel support of claim 2, wherein each lumen is fluidly coupled by no more than one fuel support aperture and one lower aperture.

4. The fuel support of claim 2, wherein each lumen is substantially free of multiple bends, angles, and curves from the fuel support aperture to the lower aperture.

5. The fuel support of claim 1, wherein
   each lumen includes a lower aperture,
   at least one lumen includes a gradual reduction in a cross-sectional area of the lumen from the respective fuel support aperture to the respective lower aperture.

6. The fuel support of claim 2, wherein at least one lumen includes a single substantial reduction in the cross-sectional area of the lumen between the fuel support aperture and the lower aperture.

7. The fuel support of claim 1, further comprising:
   a flow control member positioned in the at least one lumen and configured for attenuating the fluid flow through the lumen in which the flow control member is positioned;
   wherein the flow control member are removably engaged with lumen.

8. The fuel support of claim 7, further comprising:
   a fixture about, at least a portion of, an interior surface defining each lumen;
   wherein the fixture is configured to at least partially secure the flow control member within the lumen.

9. The fuel support of claim 8, wherein the fixture includes a lip extending from at least a portion of the interior surface defining the lumen.

10. The fuel support of claim 9, wherein the lip is formed about a circumference of the interior surface of the lumen.

11. The fuel support of claim 8, wherein the fixture is selected from the group consisting of a stepped reduction in the diameter of the lumen, a temporary reduction in the diameter of the lumen, and one or more tabs extending from a portion of the interior surface defining the lumen.

12. The fuel support of claim 8, wherein each fuel support aperture has a substantially square shape,
   wherein each of the lumen has a substantially circular shape,
   wherein the flow control member has a substantially square shape dimensioned for positioning within the fuel support apertures, and
   wherein the fixture is formed from the stepped transition from the substantially square shape to the substantially circular shape.

13. The fuel support of claim 7, wherein the flow control member includes a filter.

14. The fuel support of claim 7, wherein the flow control member includes a plate having one or more orifices configured for attenuating the fluid flow, the one or more orifices having a configuration selected from the group consisting of:
   a single orifice having a diameter substantially less than a diameter of the lumen;
   a plurality of orifices, each having a diameter substantially less than a diameter of the lumen;
   a plurality of orifices, each having a diameter of about one-tenth the diameter of the lumen; and
   a single orifice having a diameter of between ten and ninety percent of the diameter of the lumen.

15. The fuel support of claim 7, wherein the fuel support aperture, lumen, fixture and flow control member are dimensioned to fixedly secure the flow control member between the lower tie plate of the fuel assembly and the fixture upon insertion of the fuel support member into the fuel support aperture.

16. The fuel support of claim 7, further comprising:
a plurality of flow control members each having a different attenuation of fluid flow.

17. The fuel support of claim 16, wherein a first flow control member has a first flow attenuation,
wherein a second flow control member has a second flow attenuation that is different than the first flow attenuation,
wherein the first flow control member is positioned within a first lumen, and
wherein the second flow control member is positioned within a second lumen.

18. The fuel support of claim 17, wherein the first flow attenuation is less than about fifty percent, and
wherein the second flow attenuation is greater than about fifty percent.

19. The fuel support of claim 7, wherein the fuel support includes four fuel support apertures, four lumens, and two or more members each positioned in a different lumen, and
wherein each member is configured for attenuating a different amount of the fluid flow through the lumen in which it is positioned.

20. A fuel support for a nuclear reactor, comprising:
means for mounting a plurality of fuel assemblies within a reactor core,
the means for mounting including a plurality of lumens, each lumen fluidly coupling a respective fuel assembly to a respective control rod guide tube,
each lumen selectively providing an attenuated fluid flow to at least one of the fuel assemblies mounted by the means for mounting.

21. A fuel support for a nuclear reactor, comprising:
a body insertable into a mounting hole of a core plate, the body defining a plurality of fuel support apertures, each fuel support aperture dimensioned for receiving a lower tie plate of a fuel assembly;
a cavity dimensioned for receiving a control rod;
a plurality of lumens, each directly, fluidly coupled to a different fuel support aperture;
a fixture about, at least a portion of, an interior surface defining each lumen; and
each lumen fluidly coupling a respective fuel assembly to a respective control rod guide tube,
at least one flow control member configured for attenuating a flow of a fluid through one of the lumen as compared to a flow of fluid through at least one other lumen,
the at least one flow control member being dimensioned for positioning within one or more lumen and being at least partially secured therein by the fixture.

22. The fuel support of claim 21, wherein each lumen is configured to provide substantially unobstructed flow of fluid through the lumen absent the flow control member.

23. The fuel support of claim 21, wherein the at least one flow control member includes a plurality of flow control members each configured for attenuating a different amount of fluid flow and each being positioned within a different lumen.

24. The fuel support of claim 23, wherein a first flow control member has a first flow attenuation,
wherein a second flow control member has a second flow attenuation that is different than the first flow attenuation,
wherein the first flow control member is positioned within a first lumen, and
wherein the second flow control member is positioned within a second lumen.

25. The fuel support of claim 1, wherein each lumen fluidly couples a respective fuel assembly to a respective control rod guide tube.

* * * * *